United States Patent [19]

Maruyama et al.

[11] Patent Number: 4,714,868
[45] Date of Patent: Dec. 22, 1987

[54] CHARGING AND DISCHARGING CONTROL CIRCUIT FOR A STORAGE BATTERY

[75] Inventors: Toshio Maruyama; Noriaki Shibuya; Yukihiko Nakata, all of Nara, Japan

[73] Assignee: Sharp Kabushiki Kaisha, Osaka, Japan

[21] Appl. No.: 783,565

[22] Filed: Oct. 3, 1985

[30] Foreign Application Priority Data

Oct. 4, 1984 [JP] Japan .................. 59-209449

[51] Int. Cl.[4] .............................. H02J 7/00
[52] U.S. Cl. ........................ 320/5; 320/33; 320/40; 320/45; 323/906
[58] Field of Search .............. 320/5, 2, 33, 40, 44, 320/45; 323/906

[56] References Cited

U.S. PATENT DOCUMENTS 3,614,582 10/1971 Burkett et al. ................ 320/5
4,314,198 2/1982 Rogers ........................ 320/5 X
4,484,130 11/1984 Lowndes et al. .............. 320/40

Primary Examiner—Peter S. Wong
Assistant Examiner—Anita M. Ault
Attorney, Agent, or Firm—Birch, Stewart Kolasch & Birch

[57] ABSTRACT

A charging and discharge control circuit includes a charging control for detecting a voltage across a storage battery connected with a source of electromotive force and for outputting a first switching signal for a charging circuit of the storage battery, and a discharge control for integrating the amount of voltage discharged from the storage battery and for outputting a second switching signal for a discharge circuit. The second switching signal corresponds to the amount of voltage remaining in the storage battery. The integrated value of the amount of the voltage discharged is reset by an output signal from the charging control which is outputted at the time of completion of the charging of the storage battery.

6 Claims, 3 Drawing Figures

CHARGING AND DISCHARGING CONTROL CIRCUIT FOR A STORAGE BATTERY

BACKGROUND OF THE INVENTION

The present invention generally relates to a photo-voltaic system and, more particularly, to a charging and discharge control circuit utilizable in said photo-voltaic system for controlling a charging current as well as a discharging current by the detection of increase in voltage stored in a storage battery.

The charging and discharge control circuitry currently employed in photo-voltaic systems can be classified into two systems; a voltage control system and a current control system. The voltage control system is operable to detect a high voltage in the storage battery for the charging control and to detect a low voltage for the discharge control and is widely used in practice because the required circuitry is simple and requires no maintenance.

However, when and so long as the storage battery is charged or discharged, the voltage is greatly affected by a current then flowing and, accordingly, changes considerably. By way of example, the temperature dependent characteristics of the charging and discharge voltages are such as shown in FIG. 2. The temperature dependent characteristics of the charging voltage at 25° C. and 5° C., are shown by solid-lined and chain-lined curves, respectively, both generally exhibiting the increase in voltage with time, the rate of increase being so steep at about 100% of capacity that it can be easily detected. On the other hand, the temperature dependent characteristics of the discharge at 25° C. and 5° C. are shown by by solid-lined and chain-lined curves, respectively, both generally exhibiting the decrease in voltage with time, and since the voltage changes to a great extent at, for example, about 50% of capacity while considerably affected by temperature, it cannot be easily detected. In the graph of FIG. 2, the single-dotted chain line represents a preset level for the high voltage.

As discussed above, with the voltage control system, there is a problem in that the discharging state of the storage battery cannot be precisely detected and, therefore, the storage battery tends to be excessively discharged. The excessive voltage discharge depreciates the service life of the storage battery and, therefore, countermeasures must be employed for avoiding the problem.

On the other hand, the current control system is such that, when the integrated value of the charging or discharging current which is integrated subsequent to the complete (100%) charging of the storage battery falls below a predetermined value, the discharge control (interruption of the discharge) is effected, but when it exceeds 100%, the charging control (interruption of the charging) is effected. This system, although effective to precisely detect the charging and discharge state of the storage battery for a limited period of use, has a problem in that, as a result of lowering of the voltage storage capability of the storage battery consequent to the self-discharge occurring in the storage battery or the generation of gases attributable to decomposition of components of the storage battery, both occurring as the storage battery is used for a long period of time, an integrator-control circuit tends to produce a great error between the amount of voltage required to be stored and the amount of voltage actually stored. Because of this, manual interventions are required to permit the storage battery to be 100% charged and to form a reference condition required for a control circuit to be reset.

SUMMARY OF THE INVENTION

The present invention has been developed with a view to substantially eliminating the above mentioned problems inherent in the prior art control systems and has for its essential object to provide an improved charging and discharge control circuit which does not require any maintenance hitherto required for error adjustment and which is effective to precisely detect and control the charging and discharge state of the storage battery.

According to the present invention, a charging and discharge control circuit herein disclosed is characterized in that, in the case where the charging and discharge control of, for example, a storage battery or the like used in a photo-voltaic system, the charging control (charging interruption) is carried out by the detection of an increase in voltage stored in the storage battery and, at the same time, the amount of voltage stored which is proportional to the voltage previously discharged, then is reset and, when it has been detected that the discharge has taken place in excess of a predetermined quantity, the discharge control (discharge interruption) is carried out.

In this construction according to the present invention, since a value in a control circuit representing the amount of voltage charged is reset to a reference condition each time a terminal voltage of the storage battery fully charged with voltage becomes high, an error between the amount of voltage actually stored and the integrated value will not accumulate and, therefore, a correct value can be determined. Therefore, where the storage battery having the charging and discharge control circuitry of the present invention is incorporated in, for example, a photo-voltaic system, not only can the amount of voltage stored by measured accurately, but also it can be used as a power source effective to provide electric power steadily.

BRIEF DESCRIPTION OF THE DRAWINGS

This and other objects and features of the present invention will become clear from the following description taken in conjunction with a preferred embodiment thereof with reference to the accompanying drawings, in which.

DETAILED DESCRIPTION OF THE EMBODIMENT

Figure 1:
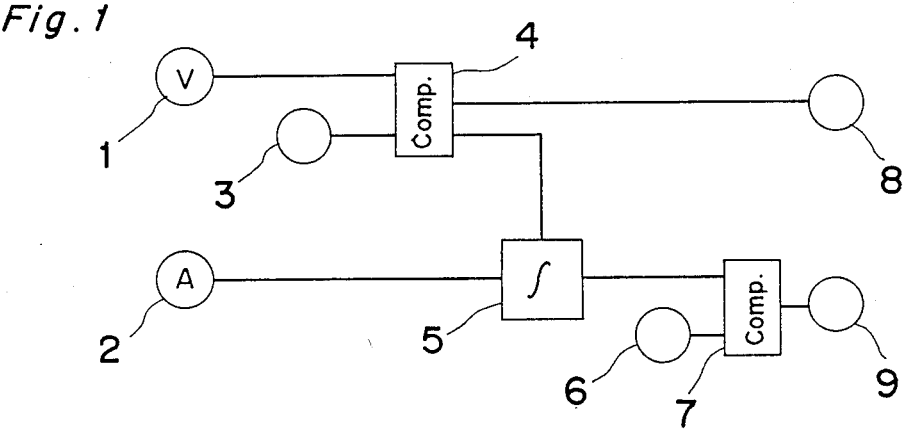
FIG. 1 is a circuit block diagram showing a charging and discharge control according to the present invention.

Referring now to FIG. 1, a voltage input terminal 1 and a current input terminal 2 are adapted to be supplied with a voltage input signal and a current input signal, respectively, said voltage and current input signals being fed from a chargeable and dischargeable storage battery incorporated in a photo-voltaic system. The voltage input signal so supplied to the voltage input terminal 1 is in turn fed to a first comparator 4 to which a signal indicative of a predetermined high voltage is also supplied from a high voltage setting circuit 3. On the other hand, the current input signal supplied to the current input terminal 2 is in turn supplied to an integrator 5 to which a reset signal outputted from the first comparator 4 is also applied. The integrator 5 has an output connected to a second comparator 7 to which a storage voltage setting circuit 6 is also connected. The circuitry shown in FIG. 1 includes two output terminals, a charging control terminal 8 which is connected with an output terminal of the first comparator 4 and from which a charging control signal emerges, and a discharge control terminal 9 which is connected with an output terminal of the second comparator 7 and from which a discharge control signal emerges.

Figure 2:
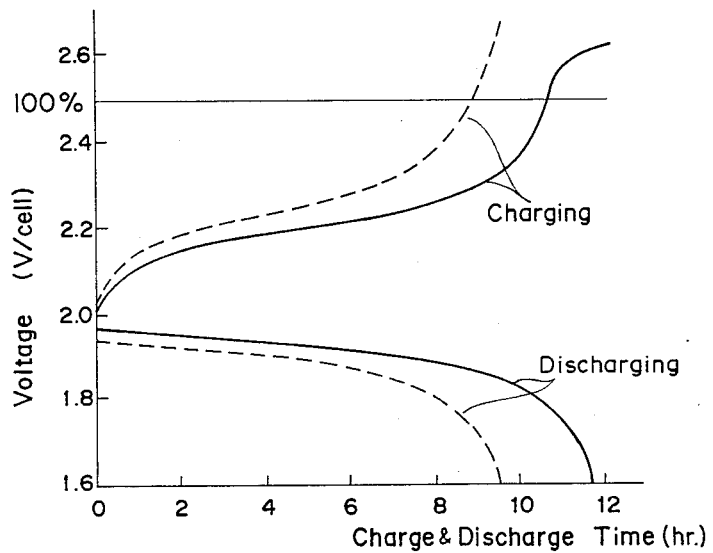
FIG. 2 is a graph showing the temperature dependent characteristics of charged and discharged voltages in a storage battery.

The first comparator 4 constantly compares the voltage input signal with the predetermined high voltage and generates the charging control (charging interruption) signal to the charging control terminal 8 when the voltage input signal exceeds the predetermined high voltage which has been set, as shown by the single-dotted line in FIG. 2, at a level adjacent a set-up region of the voltage. Simultaneously with the generation of the charging control signal from the first comparator 4, the latter also applied the reset signal to the integrator 5. In response to the reset signal, the integrator 5 causes an integrating counter to be reset while the amount of voltage stored at the time the reset signal has been fed to the integrator 5 is taken as a reference value 100%. By integrating the current subsequently flowing from the storage battery, the amount of voltage remaining in the storage battery is calculated. The second comparator 7 constantly compares the amount of voltage remaining in the storage battery with a predetermined storage voltage determined by the storage voltage setting circuit 6 and generates the discharge control (discharge interruption) signal to the discharge control terminal 9 when the amount of voltage remaining in the storage battery decreases below the predetermined storage voltage.

In the construction described above, when the storage battery is charged by the application of an electromotive force or the like from a solar battery, and when the voltage at the voltage input terminal 1 subsequently increases to a sufficiently high value, the charging control signal is outputted from the charge control terminal 8 to interrupt the charging operation and, at the same time, an integrated value of an arithmetic control circuit is reset in response to the reset signal outputted in synchronism with the charging control signal. Accordingly, during the course of use for a prolonged period of time, no error can be accumulated in the amount of voltage stored and, therefore, the amount of voltage stored can be accurately measured. Moreover, no cyclic maintenance is needed and, therefore, no laborious effort is required.

A switching instrument of a main circuit to be incorporated in the above described charging and discharge control device is employed in the form of a relay, a transistor or the like. The switching instrument operates in response to the outputted charging or discharge circuit of the storage battery. Where the switching instrument is employed in the form of a relay, the charging or discharge control signal will be an ON or OFF signal, whereas where the switching instrument is employed in the form of a transistor, the charging or discharge control signal will be a signal proportional to the difference between the voltage input signal and the predetermined high voltage. In the case of the relay used for the switching instrument, a multi-stage control can be possible and, in such case, a plurality of combinations of the high voltage setting circuit 3 and the first comparator 4 may be connected in parallel so that a plurality of charging control signals can be obtained. Also, it is possible to employ this combination with the voltage control system so that the discharge control can be effected when, at the time of discharge of the voltage, the voltage stored in the storage battery falls below a predetermined low voltage.

Figure 3:
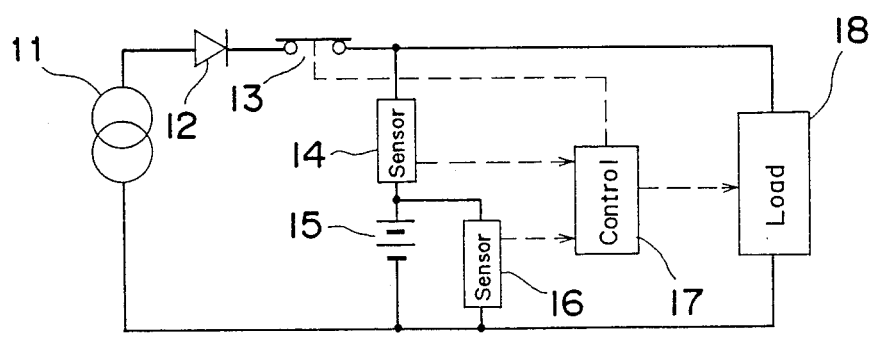
FIG. 3 is a circuit block diagram showing a photo-voltaic system to which the present invention is applied.

An example of a photo-voltaic system having the above described charging and discharge control device incorporated therein is shown in FIG. 3 in the circuit block diagram.

Referring to FIG. 3, an electromotive force of an array of solar batteries 11 is applied to a series circuit of current sensor 14 and storage battery 15 through a reverse-flow preventive diode 12 and a charging control relay 13 connected in series with the diode 12. A voltage sensor 16 is connected in series with the current sensor 14, but in parallel to the storage battery 15. Detection signals outputted respectively from the current and voltage sensors 14 and 16 represent the voltage and current input signals, respectively, which are applied to the voltage and current input terminals of the charging and discharge control device, shown by 17, of the construction described with reference to and shown in FIG. 1. A load 18 is connected between the charging control relay 13 and the solar battery array 11.

The charging and discharge control device 17 is operable in such a way that, when it receives the voltage input signal corresponding to the voltage across the storage battery 15, the voltage input signal can be compared with the predetermined high voltage and when the voltage across the storage battery 15 increases to a sufficiently high value, the charging rate can be reset to 100%, permitting the charging and discharge control device 17 to generate the charging control signal with which the charging control relay 13 can be opened to interrupt the supply of the output from the solar battery array 11 therethrough. In this case, the load 18 is operated by electric power supplied from the storage battery 15. When the voltage across the storage battery 15 decreases, the charging control relay 13 is closed to turn the charging circuit on so that the storage battery 15 can be charged. When the integrated value of the current sensor 14 operable to integrate the amount of voltage discharged from the storage battery 15 during the operation of the load 18 indicates that the voltage discharged from the storage battery 15 has exceeded a predetermined discharge voltage, the discharge control signal is outputted to bring the operation of load 18 to a halt. The operation of the load 18 can be resumed when the amount of voltage remaining in the storage battery 15 exceeds the predetermined discharged voltage.

Although the present invention has fully been described in connection with the preferred embodiment with reference to the accompanying drawings, it is to be noted that various changes and modifications are apparent to those skilled in the art. By way of example, although the charging and discharge control device according to the present invention has been described as applied in a photo-voltaic system, it can be applied in any photo-voltaic system having a storage battery, a power generating system for the solar battery, an automobile battery system or any other electric system making use of a storage battery.

Accordingly, such changes and modifications are to be understood as included within the scope of the present invention as defined by the appended claims, unless they depart therefrom.

What is claimed is:

1. A charging and discharging control circuit for a storage battery, comprising:
    charging control means for detecting a voltage across said storage battery and disabling the charging of said battery when said voltage reaches a first predetermined level; and
    discharging control means for detecting the total amount of voltage discharged from said battery and disabling the discharging of said battery when said total amount of voltage reaches a second predetermined level,
    said charging control means resetting said discharging control means simultaneously with the disabling of said charging of the storage battery.

2. The charging and discharging control circuit of claim 1, further including solar cell for charging said storage battery.

3. The charging and discharging control circuit of claim 2, wherein said charging control means comprises a comparator for comparing the voltage across said storage battery with a reference voltage corresponding to said first predetermined level.

4. The charging and discharging control circuit of claim 3, further comprising switching means connected between said solar cell and said storage battery, said comparator producing an output signal for opening said switching means when the voltage across said storage battery coincides with said reference voltage.

5. The charging and discharging control circuit of claim 1, wherein said discharging control means comprises an integrator for integrating the amount of current flowing from said storage battery during the discharging thereof, which integrated current is proportional to the amount of voltage discharged, and a comparator for comparing the integrated amount of current with a reference value corresponding to said second predetermined level.

6. The charging and discharging control circuit of claim 5, further comprising means for disconnecting a load previously connected in circuit with said storage battery, said comparator producing an output signal for activating said means for disconnecting when the integrated amount of current coincides with said reference value.

* * * * *